United States Patent [19]

Curzon

[11] 3,967,681
[45] July 6, 1976

[54] REPAIR OF CEMENT SHEATH AROUND WELL CASING

[75] Inventor: James E. Curzon, Bartlesville, Okla.

[73] Assignee: Phillips Petroleum Company, Bartlesville, Okla.

[22] Filed: Sept. 30, 1975

[21] Appl. No.: 618,194

[52] U.S. Cl. .............................. 166/277; 166/294; 166/295
[51] Int. Cl.² .................. E21B 33/138; E21B 33/14
[58] Field of Search ........... 166/277, 285, 295, 294, 166/292, 293, 291

[56] References Cited
UNITED STATES PATENTS

| | | | |
|---|---|---|---|
| 2,582,909 | 1/1952 | Laurence | 166/291 |
| 2,985,239 | 5/1961 | Shell | 166/293 |
| 3,016,092 | 1/1962 | Harvey et al. | 166/293 |
| 3,070,163 | 12/1962 | Colby et al. | 166/293 X |
| 3,123,101 | 3/1964 | Blount et al. | 166/277 X |
| 3,308,885 | 3/1967 | Sandiford | 166/295 |
| 3,614,985 | 10/1971 | Richardson | 166/294 |
| 3,687,200 | 8/1972 | Routson | 166/295 X |
| 3,757,863 | 9/1973 | Clampitt et al. | 166/270 X |
| 3,785,437 | 1/1974 | Clampitt et al. | 166/294 X |
| 3,845,822 | 11/1974 | Clampitt et al. | 166/294 X |

Primary Examiner—Stephen J. Novosad

[57] ABSTRACT

A method is provided for repairing a cement sheath around the casing in a well bore in which a retainer is inserted within the casing below perforations in the casing adjacent an area of cement sheath requiring repair; a packer means is inserted within the casing above perforations in the casing adjacent the area of cement sheath requiring repair; a gellable polymer composition is injected through the perforations and into the well bore and adjacent underground formation and allowed to gel; thereafter a sufficient amount of cementitious material is injected through the perforations into the well bore around the casing with sufficient pressure applied to squeeze gel from the well bore into the formation and replace the gel with cementitious material; the cementitious material is allowed to set; and the packer, cementitious material and retainer are removed from the casing interior.

3 Claims, No Drawings

REPAIR OF CEMENT SHEATH AROUND WELL CASING

BACKGROUND OF THE INVENTION

This invention relates to wells for the production of oil or gas from underground formations. In one of its aspects this invention relates to the cement sheath around the well casing of such a well. In another of its aspects this invention relates to the repair of the cement sheath around such a well casing. In yet another aspect this invention relates to the use of gels in underground formations. In still another aspect this invention relates to squeeze cementing techniques in underground wells.

In the preparation of a well for tapping an underground formation to produce the gas and oil contained in the formation a casing is installed within a bore hole and the space between the wall of the bore hole and the outer face of the casing is filled with cementitious material which upon setting anchors the casing in place. Perforations are provided in the well casing in areas of the underground formation from which production is taken. It often happens that the cement sheath adjacent these perforated areas becomes broken away, cracked away from the well bore surface or cracked within the cement sheathing itself so that water can flow through or around the damaged sheathing. Sometimes the damaged areas allow an influx of water in sufficient amount to interfere with production of hydrocarbon products from the underground formation.

It is an object of this invention to provide a method for repairing a cement sheath around the casing in a well bore.

Other objects, aspects and the various advantages of this invention will be apparent upon reading the specification and the appended claims.

STATEMENT OF THE INVENTION

According to the invention a method is provided for repairing a cement sheath around the casing in a well bore. The method entails first inserting a retainer below the perforations in the casing adjacent an area requiring cement sheath repair. Then a packer is inserted within the casing above the perforations in the casing adjacent the area requiring cement sheath repair. The relationship between the placing of the retainer and the packer is such that a limited number of perforation is exposed above the retainer. A gellable polymer composition is then injected through tubing connected from the surface to the packer with the gellable polymer composition passing through the perforations and into the annular space between the well casing and the bore hole wall, into the cracks in the cement sheathing, and into the permeable portions of the surrounding underground formation. The polymer is then allowed to gel. A cementitious composition is then injected through the tubing into the casing, through the perforations in the casing wall into the annular space with the application of sufficient pressure to squeeze gel from the well bore and cracks in the cement sheathing thereby replacing the gel with cementitious material. The cementitious material is allowed to set and the packer, cementitious material and retainer are removed from the casing interior.

The method of this invention is applicable for repair of the cement sheath either above or below the perforated area in a well casing. In either instance the placement of the retainer and the packer will be designed to have a minimum number of perforations in the casing exposed as openings through which the gelling composition and the cementitious material can be passed.

This is a superior method for repairing the cement sheath in a well bore because the gel that is formed in the underground formation acts as a permeability barrier in depth away from the well bore. This barrier will not flow under moderate pressure gradients so that using it in conjunction with a cement barrier produced by a squeeze cementing technique permits a less sturdy barrier of cement to be installed immediately around the casing because less water pressure will be directly pressing on the cement since the water pressure will be distributed over the gelled polymer surface in the formation. The cement squeeze also stands a better chance of success in producing a solidified barrier because the cement will be held in place by the gelled polymer so that the cementitious material will not have the tendency to fall out of place because of the effect of gravity or to be segregated because of the effect of gravity.

Any polymeric composition that can be gelled in situ in an underground formation is suitable for the process of this invention. Polymeric materials which contain at least one chemically crosslinkable, at least water-dispersible polymer selected from the group consisting of polyacrylamides and related polymers, cellulose ethers, and polysaccharides which can crosslinked or gelled in an aqueous medium with a catalytic gelling agent such as described in U.S. Pat. No. 3,785,437 are well suited for the process of this invention. I have found that solutions of carboxymethyl cellulose to which are added a metal bichromate dihydrate and sodium bisulfite solution are particularly well suited for forming a gel useful in this process.

General processes for squeeze cementing are well known to practitioners of the art. Such methods generally require that an auxilliary column of tubing be placed inside the casing which is to be cemented. The auxilliary tubing passes through a packer which closes the space between the tubing and casing at the level above which cementing is undesirable. A retainer has been previously placed within the casing closing the lower end of the casing at the level below which cementing is not desired. Cement is pumped down through the tubing and out into the well. The cement is then squeezed by applying high pump pressure with all outlets at the surface closed. The pressure is maintained until initial set of the cement is obtained.

The process of this invention can be shown by the following example which is meant to be illustrative and not exclusive.

EXAMPLE I

The area within the casing nearest the portion of the cement sheath that is to be repaired is isolated with a retainer below the perforations in the casing to be isolated and a packer containing a tubing inlet from the surface which is installed above the perforations to be isolated.

Twenty-four hours prior to treating the well 875 pounds of carboxymethyl cellulose polymer is mixed in 250 barrels of water. The mixing tank is circulated to obtain a smooth mixture of a polymer concentration of approximately 10,000 ppm. After the carboxymethyl cellulose is in solution 35 pounds (400 ppm) of sodium bichromate dihydrate ($Na_2Cr_2O_7 \cdot 2H_2O$) is added to the mixing tank so that a uniform mixture can be obtained.

200 Barrels of water are pumped into the well to obtain stabilization. Then approximately 250 barrels of polymer-bichromate solution is injected into the well at the same rate as established for pumping the water. While pumping the 250 barrel solution, sodium thiosulfate ($Na_2S_2O_3 \cdot 5H_2O$) is added to the suction of the pump at a rate of 0.7 pounds of sodium thiosulfate per barrel of solution. The sodium thiosulfate can be dissolved in fresh water at a concentration of 1.6 pounds per gallon and that solution injected into the pump suction at a rate of 1 percent of the pumping rate. The polymer fluid is displaced into the well with minimum pressure using a minimum volume of overflush.

A squeeze cementing operation is then carried out using 100 sacks of Diacel LWL cement which is a low water loss cement, using a minimum pressure of about 500 psi. On development of a squeeze pressure of about 100 psi the casing is washed out. The low water loss cement used comprises Portland cement, carboxymethyl hydroxyethyl cellulose, and sodium silicate. The well is then shut in for approximately 24 hours to allow the cement to set and the polymer to complete gelation and adsorption in the formation. The well is then recompleted and production re-established.

I claim:

1. A method for repairing a cement sheath around a casing in a well bore comprising:

a. inserting a retainer within the casing below perforations in the casing adjacent an area requiring cement sheath repair;
    b. inserting a packer within the casing above perforations in the casing adjacent an area requiring cement sheath repair;
    c. injecting a gellable polymer composition from the casing through the perforations into the adjacent underground formation;
    d. allowing the polymer to gel;
    e. thereafter injecting sufficient cementitious material into the well bore around the casing with application of sufficient pressure to squeeze gel from the well bore into the formation and replace the gel with cementitious material;
    f. allowing the cementitious material to set under pressure; and
    g. removing the packer, cementitious material and retainer from the casing interior.

2. A method of claim 1 wherein said gellable polymer composition comprises a polymer selected from the group consisting of polyacrylamides, carboxycelluloses, and polysaccharides.

3. A method of claim 2 wherein the polymer is carboxymethyl cellulose, in admixture to form a gellable composition with sodium bichromate dihydrate, sodium bisulfite, and water.

* * * * *